United States Patent [19]

Forbes

[11] Patent Number: 5,744,695

[45] Date of Patent: Apr. 28, 1998

[54] APPARATUS TO CHECK CALIBRATION OF MASS FLOW CONTROLLERS

[75] Inventor: Gregory Russell Forbes, Boerne, Tex.

[73] Assignees: Sony Corporation, Tokyo, Japan; Sony Electronics Inc., Park Ridge, N.J.

[21] Appl. No.: 781,405

[22] Filed: Jan. 10, 1997

[51] Int. Cl.$^6$ ............................................. G01F 25/00
[52] U.S. Cl. ............................................................ 73/1.35
[58] Field of Search ................................. 73/1.16, 1.35, 73/1.36; 222/145.1

[56] References Cited

U.S. PATENT DOCUMENTS 5,233,861  8/1993  Gore et al. ............................... 73/1.16

*Primary Examiner*—Robert Raevis
*Attorney, Agent, or Firm*—Wood, Herron & Evans, L.L.P.

[57] ABSTRACT

A calibration apparatus is applied to a gas control panel (46) that uses mass flow controllers (70,98,118) to control the flows of different gases to a processing chamber (42). The gas control panel (46) includes a mass flow meter (150) mounted on the gas control panel (46). The mass flow meter (150) is connected between pre-existing and unused gas valves (152, 156) on the gas control panel (46) in place of a mass flow controller that is also otherwise unused. The meter input valve (152) for the mass flow meter (150) is in fluid communication with the mass flow controllers (70, 98, 118). The input and output meter valves (152, 156) are connected to respective pre-existing solenoids (154, 158) which in turn are connected to a gas flow control (48). A final valve solenoid (82) controls a final valve (80) which is also in fluid communication with the mass flow controllers (70, 98, 118) and routes the gases to the processing chamber (42). The calibration system includes a switching device (162) mounted on the gas control panel (46) and connected between the output (163) of the final valve solenoid (82) and a control input (81) of the final valve (82). The switching device (162) has a control input (164) connected to an output of the meter input valve solenoid (154). Thus, in one state, the meter input solenoid (154) inhibits gas flow through the processing chamber (42) and permits gas flow from the mass flow controllers (70, 98, 118), through the mass flow meter (150) in order to check the calibration of the mass flow controllers. In an opposite state, the meter input solenoid (154) inhibits gas flow through the mass flow meter (150) and permits flow to the processing chamber (42).

15 Claims, 1 Drawing Sheet

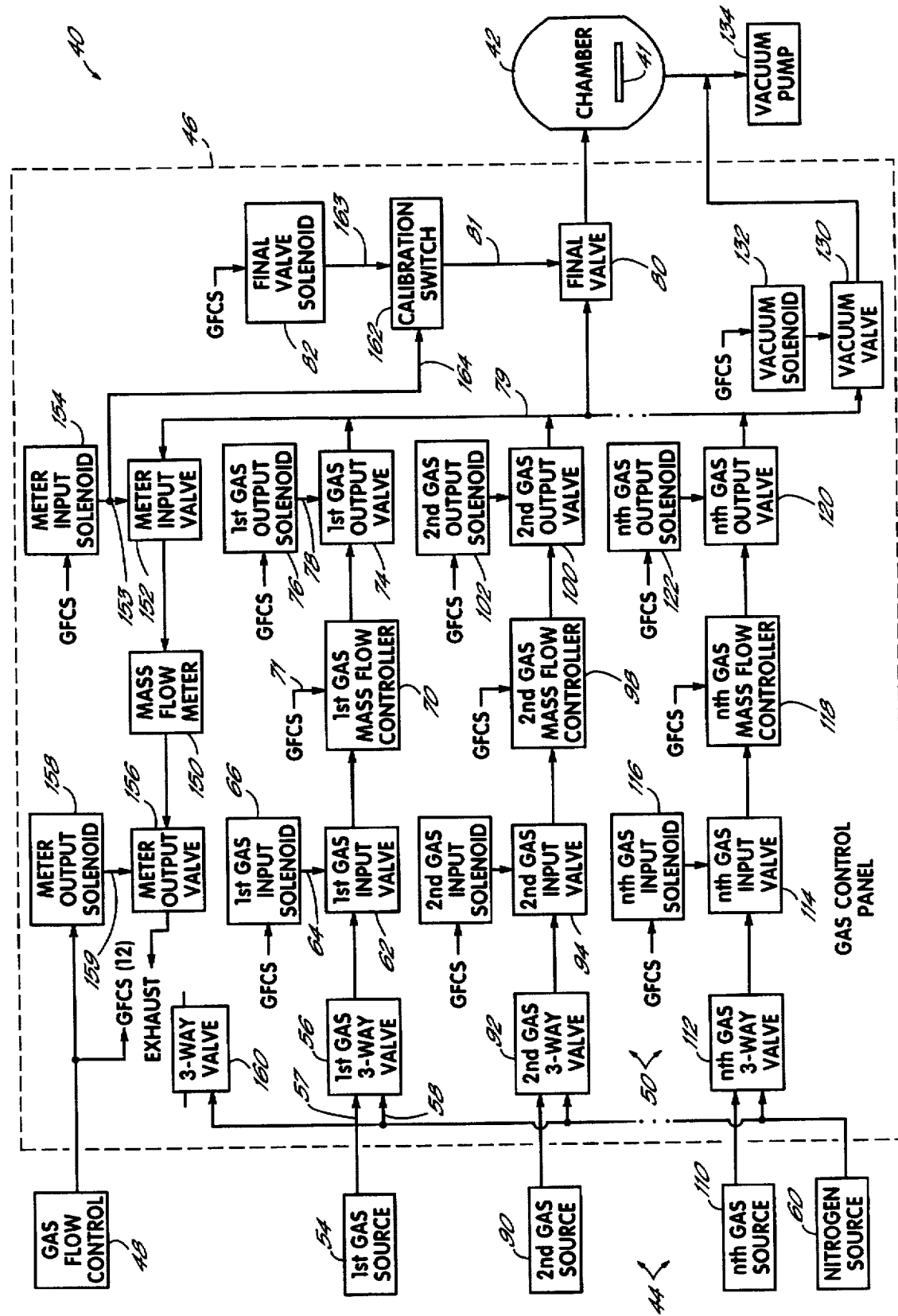

5,744,695

APPARATUS TO CHECK CALIBRATION OF MASS FLOW CONTROLLERS

FIELD OF THE INVENTION

This invention relates gas flow controllers and more particularly, to an apparatus for checking the calibration of a mass flow controller.

BACKGROUND OF THE INVENTION

Numerous industrial processes require the simultaneous control over the flow of different gases. Further, many processes, for example, deposition and etching processes in which a material is deposited or etched from a substrate, require precise control over the quantity or mass of gas flowing at different time periods during the process. Often, such gas flow control is achieved utilizing a mass flow controller for each of the gases being used in the process. The quantity or mass of gas being delivered to the process over any given period of time will be a function of the gas density. Therefore, for lighter or less dense gases, for example, helium, there will be less mass delivered to the process over a fixed period than with a heavier or denser gas, such as oxygen. Normally, the gas control system includes a mass flow controller for each gas; and each mass flow controller is uniquely calibrated to the gas flowing therethrough. Thus, each controller provides a readout, either analog or digital, that is unique to and representative of the gas flowing through the controller.

To maintain the desired quality of the deposition or etching process, the mass flow controllers must provide an accurate and repeatable operation. Therefore, in most environments, the calibration of the mass flow controllers is periodically checked, and the controllers are re-calibrated, if necessary. Normally, in their operating environment, the mass flow controllers are centrally located on a gas control panel and are isolated by gas valves. Although newer gas control systems provide a built-in mass flow controller calibration system, the older gas control panels require a manual calibration.

With such older gas control panels, one calibration technique is to shut off the gas valves on the input and output of the mass flow controller, physically remove the mass flow controller from the gas control panel and reinstall it in a calibration station. After the calibration is checked and adjusted, the controller is then reinstalled in the gas control panel.

With another calibration technique for older gas control panels, a rolling cart containing a calibration station is positioned adjacent to the gas control panel. A gas output line from the control panel is disconnected from a processing chamber and reconnected to the calibration cart. The calibration cart contains a plurality of mass flow meters, each meter being calibrated to read the mass flow from a different one of the mass flow controllers. A first gas flow is initiated through a first mass flow controller on the gas control panel and then through a corresponding first mass flow meter on the calibration cart. After the first mass flow controller calibration check is completed, the first gas flow is shut off; and a second gas flow is then directed through a second mass flow controller on the gas control panel and into a second mass flow meter on the calibration cart. The calibration process is continued by sequentially flowing a gas through each mass flow controller on the gas control panel and through a corresponding mass flow meter on the calibration cart. Each gas flow meter is used to check the calibration and recalibration of a respective mass flow controller.

As will be appreciated, the process of calibrating the mass flow controllers in a gas control panel is time consuming. Whether the controller is physically removed from the gas control panel or connected to a calibration meter on a cart, the partial vacuum under which the system is normally kept must be broken and the system bled to atmospheric pressure. The calibration check is then made; and thereafter, the gas control panel system is reconnected; and the operating vacuum is re-established. The entire process normally takes four hours or more. However, only a small portion of that time is used for the calibration process itself. Most of the time is consumed by the process of disconnecting and reconnecting the gas control panel and thereafter, re-establishing the desired vacuum. Further, during the calibration checking process, the normal operation of the mass flow controllers and their associated processes must be terminated. Thus, the desired deposition or etching processes are not being performed, and the above-described calibration checking procedures have the disadvantage of requiring a very costly interruption of production.

Consequently, there is a need to provide a calibration checking device for older gas control panels that do not have a built-in calibration checking capability which permits the calibration of the mass flow controllers to be done more quickly with less interruption to production.

SUMMARY OF THE INVENTION

The present invention provides a calibration system that permits the calibration of mass flow controllers on a gas control panel to be checked without having break and re-establish the operating vacuum for the system. Thus the present invention has the advantage of performing a mass flow controller calibration on older gas flow control panels much more quickly than with prior techniques. Further, the calibration system of the present invention can be easily installed on the older gas control panels that do not have a built-in calibration check.

According to the principles of the present invention and in accordance with the preferred embodiments, a calibration apparatus is applied to a gas control panel that uses mass flow controllers to control the flows of different gases to a processing chamber. The gas control panel of the present invention includes a mass flow meter mounted on the gas control panel. The mass flow meter is connected between pre-existing and unused input and output valves on the gas control panel in place of a mass flow controller that is also otherwise unused. The meter input valve for the mass flow meter is in fluid communication with the mass flow controllers, and the meter output valve for the mass flow meter is connected to an exhaust. The input and output valves are connected to respective pre-existing solenoids which in turn are connected to a gas flow control. The valves have control inputs fluidly connected to outputs of the solenoids which control the operation of the valves in response to signals received from the gas flow control. A final valve solenoid controls a final valve which is also in fluid communication with the mass flow controllers and routes the gases to the processing chamber. The calibration system includes a switching device mounted on the gas control panel and connected between the output of the final valve solenoid and a control input of the final valve. The switching device has a control input connected to an output of the meter input valve solenoid.

During a processing operation, the gas flow control causes the meter input solenoid to close the input meter valve and open the calibration switch which inhibits of the flow of gas from the mass flow controllers through the mass flow meter and permits the final valve to be opened by the final valve solenoid, thereby routing the gases to the processing chamber. To check the calibration of the mass flow controllers, the gas flow control causes the meter input valve solenoid to open the meter input valve and close the switching device. In that state, the final valve solenoid is inhibited from opening the final valve; and gas from a mass flow controller is are permitted to flow through the meter input valve and the mass flow meter, thereby permitting the calibration of the mass flow controller with the mass flow meter.

The above calibration system is resident on the gas control panel and permanently connected to the system, and therefore, the calibration of the mass flow controllers may be checked without having to break and re-establish the partial vacuum in the processing chamber and the other components of the system. Thus, the calibration system has a major advantage of being able to check the calibration of the mass flow controllers in a relatively short period of time. Further, the system has a further advantage of reducing the cost of lost production while the processing chamber is out of service during the time the calibration of the mass flow controllers is being checked. In addition, the calibration system of the present invention utilizes many existing but unused components on the gas control panel, and therefore, it can be implemented at a lesser cost than other calibration checking systems.

These and other objects and advantages of the present invention will become more readily apparent during the following detailed description taken in conjunction with the drawings herein.

BRIEF DESCRIPTION OF THE DRAWINGS

The FIGURE is a schematic block diagram of a gas control panel in accordance with the principles of the present invention.

DETAILED DESCRIPTION OF THE INVENTION

The FIGURE illustrates a gas system 40 that may be used in the deposition or etching of material from a substrate 41 within a processing chamber 42. For example, the gas system 40 is typical of that found in a model LAM 580 Autoetch machine commercially available from LAM Research Corporation of Fremont, Calif. The gas system 40 further includes a plurality of sources of gases 44 which are normally located at a location remote from the chamber 42. The gases from the gas sources 44 are normally supplied to a gas control panel 46 by stainless steel pipes. The gas control panel 46 is often located in the general proximity of the chamber 42 and contains numerous valves, associated solenoids, flow controllers, etc. The solenoids and controllers are operated by gas flow control signals ("GFCS") received from a gas flow control 48. The gas flow control 48 is a programmable microprocessor based control that is normally used with the processing equipment, for example, the model LAM 580 Autoetch machine identified above. The solenoids respond to those signals by providing different pneumatic signals or air pressures to the control inputs of their associated valves, thereby either opening or closing the valves. The gas flow control also provides signals to mass flow controllers which control the quantity of gas flowing therethrough.

Normally a gas control panel provides a plurality of parallel gas flow paths for a number of different gases, and each gas flow path has a serial network of valves and a mass flow controller. For example, a gas control panel may have four, six, eight or more gas flow paths to control the flow of a like number of gases. For example, in an etching process, helium, oxygen, freon and other gases may be used. A first of the gas flow paths 50 includes a first gas source 54 connected to a first input 57 of a 3-way gas valve 56. The gas valve 56 has a second input 58 connected to a source of nitrogen gas 60. During an etching process, the 3-way valve 56 is switched to block the flow of nitrogen and pass the gas flow from the first source 54 on input 57. At other times, the 3-way valve 56 may be switched to block the flow of the first gas and pass the flow of nitrogen on the input 58 in order to purge the first gas from the system. The first gas 3-way valve 56 is connected to a first gas input valve 62 that has a control input 64 receiving operating signals in the form of pneumatic pressures from the first gas input solenoid 66. The state of the first gas input solenoid 66 is controlled by gas flow control signals from the gas flow control 48. When the first gas input solenoid 66 operates to open first gas input valve 62, the first gas flows through a first mass flow controller 70 which also receives gas flow control signals from the gas flow control 48 on a control input 71 commanding the quantity or mass of gas to be passed through the mass flow controller 70. The mass flow controller 70 is uniquely calibrated to provide a readout that represents the quantity or mass of the first gas flowing therethrough. The mass flow controller 70 has an output connected to a first gas output valve 74 that in turn is controlled by a first gas output solenoid 76. As with the first gas input solenoid 66, the first gas output solenoid 76 is responsive to gas flow control signals from the gas control 48 to provide pneumatic signals on its output 78 for controlling the operation of the first gas output valve 74. The first gas is provided on an output line 79 to a final valve 80 operated by the final valve solenoid 82 to control the flow of gases into the chamber 42.

Gas from a second gas source 90 flows through a second gas 3-way valve 92, a second gas input valve 94 controlled by a gas input solenoid 96. Thereafter the second gas flows through a mass flow controller 98 and then through a gas output valve 100 controlled by a second gas output solenoid 102. The components controlling the flow of gas from the second gas source 90 are substantially identical to the components previously described that control the flow of gas from the first source 54. Any additional number of parallel gas flow paths may exist across the gas control panel 46 and are represented by the flow path for gas from an $n^{th}$ gas source 110, $n^{th}$ gas 3-way valve 112, $n^{th}$ gas input valve 114, $n^{th}$ gas input solenoid 116, $n^{th}$ gas mass flow controller 118, $n^{th}$ gas output valve 120 and $n^{th}$ gas output solenoid 122. As with the output from the output valve 74, the outputs from the other output valves 100, 120 are connected to and mix in the common line 79 and provide an input to the final valve 80. The common output line 79 is also connected to a vacuum valve 130 controlled by a vacuum solenoid 132. A vacuum pump 134 is connected to the processing chamber 42 and is operative to maintain the chamber under a partial vacuum. The vacuum pump 134 is also connected to the vacuum valve 130, and the solenoid 132 operates the vacuum valve 130 in response to the gas flow control 48 to apply a partial vacuum to the common line 79 when the output valves 74, 100, 120 and the final valve 80 are closed, that is, when there is no gas flow in the line 79.

The operation of the etching process performed in the chamber 42 is normally described in a recipe tailored to a particular substrate being etched. The recipe is often entered as a program to the gas flow control 48, which pursuant to the recipe, provides gas flow control signals to the various solenoids and mass flow controllers on the gas control panel. Thus, the various valves and controllers are operated to provide the desired quantities of gases into the chamber 42 to perform the etching process.

As previously described, to maintain the desired quality of the etching process, the calibration of the mass flow controllers is periodically checked. While such calibration checks are performed automatically on newer equipment, older gas control panels require that the calibration of the mass flow controllers be checked manually. In some situations, each mass flow controller is physically removed from the gas panel and mounted in a calibration fixture for checking. In other situations, the output of the final valve 80 is disconnected from the chamber 42 and connected to a calibration panel (not shown) mounted on a movable cart. The calibration panel contains a number of mass flow meters which have been calibrated to directly read the mass flow of the gases being controlled by the gas control panel 46. Using a calibration recipe or other manual control, the gas flow control 48 operates the solenoids and controllers in a sequential manner such that each gas sequentially flows through its respective mass flow controller and mass flow meter on the calibration cart. Thus, the calibration of each mass flow controller can be checked using the mass flow meter on the calibration cart. With each of the above calibration processes, it is necessary to first break the system vacuum, connect the mass flow controllers to a calibration system, perform the calibration process, reconnect the mass flow controllers to the chamber, and then re-establish the partial vacuum in the system.

To eliminate the requirement of breaking the system partial vacuum, the present invention provides a modification to the gas control panel 46 that permits the calibration of the mass flow controllers to be checked more easily and in less time. A great many etching processes do not require all of the gas flow paths that are typically found on a gas control panel. For example, a gas control panel may contain six gas flow paths with their respective identical sets of solenoids, valves, and massive flow controllers. However, if the etching process in the chamber 42 never requires more than five independent gas flow paths, then, there are a number of spare valves and solenoids on the gas control panel 46 that may be used for other purposes. The present invention uses those unused, spare valves and solenoids to provide a calibration system on the gas control panel for checking the calibration of the mass flow controllers.

In the calibration system of the present invention, a mass flow controller (not shown) associated with the spare valves and solenoids is removed, and a mass flow meter 150, typical of those commercially available from Tylan General of Austin, Tex., is mounted in its place on the gas control panel 46. As will be appreciated, the mass flow meter 150 is sized to match the gas flows used in the process. Further, the mass flow meter 150 is connected to have a gas flow in an opposite direction from the gas flow direction of the mass flow controller that it replaces. In other words, the mass flow meter 150 is connected to have a gas flow with respect to the gas panel opposite the direction of gas flow of the mass flow controllers 70, 98, 118. A spare gas output valve is used as a meter input valve 152 which is connected to an input of the mass flow meter 150; and an associated, spare gas output solenoid now functions as a meter input solenoid 154. In a similar manner, a spare gas input valve is used as a meter output valve 156 which is connected to an output of the mass flow meter 150; and an associated, spare gas input solenoid now functions as a meter output solenoid 158. The output of the meter output valve 156 would normally be connected to a 3-way valve 160. However, to implement the present invention, that connection is broken, and the output from the meter output valve 156 is routed to an atmospheric or ventilated exhaust as is appropriate. Thus, each of the other gas flow paths on the gas control panel 46 has a potential flow path through the mass flow meter 150 to an exhaust.

As will be appreciated, gas flowing from the output valves 74, 100, 120 should flow either through the final valve 80 and into the chamber 42, or through the mass flow meter 150. There is no situation in which the gas should flow both into chamber 42 and through the mass flow meter 150. To facilitate those alternative modes of operation, a pneumatic calibration switch 162 is mounted on the gas control panel 46 and connected between the final solenoid 82 and the final valve 80. The calibration switch 162 is a 3-way, low pressure pilot, pneumatic switch, model R305 commercially available from Clippard Instrument Laboratories, Inc. of Cincinnati, Ohio. The calibration switch 162 has a control input 164 which toggles its fluid input between a normally-closed output and a normally-open output. With the present invention, only the normally-open output is used, and it is connected to the control input 81 of the final valve 80. The fluid input of the calibration switch 162 is connected to the pneumatic output 163 of the final valve solenoid 82, and the pneumatic control input 164 is connected to the output of the meter input solenoid 154. Therefore, when the meter input solenoid 154 provides a signal on the control input 153 of meter input valve 152 causing the valve 152 to open, that same signal is provided to the control input 164 of the calibration switch 162 and causes the normally-open output of the calibration switch 162 to close. Thus, the final valve 80 is prohibited from being opened by the final valve solenoid 82 and the final valve 80 is maintained in its normally-closed position; and the gas flow on the output line 79 is directed exclusively to the mass flow meter 150. Similarly, an output from the meter output solenoid 158 causing the meter output valve 156 to close will also cause the normally-open output of the calibration switch 162 to open, thereby permitting the final valve 80 to be operated by the final valve solenoid 82.

A final step in the process of installing the mass flow meter calibration checking system is to identify the mass flow meter 150 to the gas flow control 48. In its normal operation, the gas flow control 48 provides operating power to the mass flow controllers, and different size mass flow controllers utilize different control voltages from the gas flow control 48. Hence, each time a mass flow controller of a different size is installed in the gas control panel 46, that new mass flow controller must be identified to the gas flow control 48 so that it can apply the proper control voltage to the newly installed controller. In a similar manner, the gas flow control 48 provides power for the mass flow meter 150, and the size of the mass flow meter 150 must be programmed or input to the gas flow control 48 so that it will apply the proper control voltage. The size of the mass flow meter 150 is input to gas flow control 48 in a known manner as provided for by the manufacturer of the gas flow control 48.

In use, a recipe of operation for the gas control panel 46 is input to the gas flow control 48. The recipe for an etching process will command that the solenoids 154, 158 maintain the meter valves 152, 156 in their closed position, thereby inhibiting gas flow through the mass flow meter 150. The output from the meter output solenoid 158 that closes the meter output valve 156 will also cause the calibration switch 162 to open, thereby permitting fluid flow from the output of the final valve solenoid 82 to the control input of the final valve 80. The etching process recipe will also provide gas flow control signals to other solenoids 66, 76, 96, 102, 116, 122 and 82 to selectively open respective valves 62, 74, 94, 100, 114, 120 and 80, thereby providing selective gas flows through mass flow controllers 70, 98, 118 such that the desired quantities of the gases flow through the final valve 80 and into the etching chamber 42.

When it is desired to check the calibration of one of the mass flow controllers 70, 98, 118, a new recipe is input to the gas flow control 48, which causes the solenoids 154, 158 to open the valves 152, 156, thereby providing a gas flow path through the mass flow meter 150. Simultaneously, the output from the meter output solenoid 158 causes the calibration switch 162 to close, thereby prohibiting the final valve 80 from opening and further prohibiting gas flow into the etching chamber 42. In addition, the recipe will operate a selected set of input and output solenoids, for example, the first gas input solenoid 66 and first gas output solenoid 76, which opens their respective valves 62, 74 and permits gas to flow from the first gas source 54 through the mass flow controller 70, through the common output line 79 and through the mass flow meter 150.

As previously mentioned, the different gases have different densities and, therefore, the mass flow controllers must be calibrated to the particular gas being controlled. Similarly, normally, a mass flow meter measuring the mass flow of that gas is also calibrated to the gas. Since the mass flow meter 150 is used to measure the mass flows of different gases, the reading from the meter 150 must be scaled in accordance with the gas being measured. Normally, the mass flow meter 150 is calibrated to nitrogen. If the first gas source is oxygen and the first mass flow controller 70 is set to regulate a particular quantity of gas therethrough, the operator reading the mass flow meter 150 can be provided a chart that converts the reading from the gas flow meter 150 to an equivalent flow for oxygen. Alternatively, since the gas flows during a calibration process are being controlled by a recipe, the operator can be provided with a chart that simply provides a go/no-go range of the gas flow reading from the mass flow meter 150, which corresponds to the desired flow of the gas selected by the recipe.

At the end of a period of time, the recipe for the calibration process causes the gas flow control 48 to provide gas flow control signals to solenoids 66, 76 and mass flow controller 70 such that the valves 62, 74 are closed, thereby terminating the flow of gas from the first gas source 54 through the flow meter 150. Thereafter, the recipe provides gas flow control signals to the solenoids 96, 102 and mass flow controller 98, thereby opening the valves 94, 100 and permitting gas from the second gas source 90 to flow through the mass flow controller 98 and mass flow meter 150. In a similar manner as previously described, the reading from the mass flow meter 150 is used to check the calibration of the mass flow controller 98. The recipe then shuts down the flow of gas from the second gas source 90 and sequentially initiates flows from other gas sources 110 until all of the gas flow controllers 70, 98, 118 on the gas control panel 46 have been checked. As will be appreciated, if the mass flow meter 150 determines that more than one mass flow controller is out of calibration, it is highly probable that the mass flow meter 150 is not functioning properly, or that the mass flow meter has not been properly identified to the gas flow control 48.

Therefore, the present invention utilizes unused, spare components on a gas control panel in combination with a mass flow meter and a pneumatic switch to provide an apparatus for checking the calibration of mass flow controllers on the gas control panel. The calibration check can be performed in only a few minutes by simply providing a calibration recipe to the mass flow control 48. In addition, the calibration can be performed without having to break the partial vacuum on the operating system. Thus, the in-situ calibration system described above has the advantage of permitting the calibration of the mass flow controllers to be checked in substantially less time than was previously possible. Thus, time during which the production process is interrupted is substantially less, and the calibration system provides significant cost savings.

While the invention has been illustrated by the description of one embodiment and while that embodiment has been described in considerable detail, there is no intention to restrict or in any way limit the scope of the appended claims to such detail. Additional advantages and modifications will readily appear to those who are skilled in the art. For example, in the above description, the calibration switch is controlled by an output from the meter output solenoid 158. As will be appreciated the meter input and output valves operate in unison; and therefore, alternatively, the output from the meter output solenoid 158 may be connected to the control input 164 and used to operate the calibration switch 162. In addition, in implementing the calibration system of the present invention, the mass flow meter 150 is mounted in an existing but spare gas flow path on the gas control panel 46 between a spare input valve 154 and a spare output valve 158.

As will be appreciated the meter output valve 158 need not be used; and the output of the mass flow meter 150 can be connected directly to the exhaust line. While preferably the existing spare solenoids 154, 158 and corresponding valves 152, 156 are used in conjunction with the mass flow meter 150, additional valves and solenoids may be mounted on the gas control panel 46 and used instead. However, the interconnection of those additional solenoids to the gas flow control 48 will be more difficult than using existing spare solenoids. Thus, the use of existing but spare components is very desirable because it substantially reduces the cost of implementing the in-situ calibration checking apparatus.

Therefore, the invention in its broadest aspects is not limited to the specific details shown and described. Consequently, departures may be made from the details described herein without departing from the spirit and scope of the claims which follow.

What is claimed is:

1. A calibration apparatus for a gas control system controlling the flow of different gases between remote gas sources and a processing chamber, a gas control panel including a final valve having an input in fluid communication with outputs of a plurality of mass flow controllers and an output connected to the processing chamber, the final valve being connected to a final valve solenoid having an input in electrical communication with a gas flow control and an output in communication with a control input of the final valve, the final valve solenoid causing the final valve to open and close in response to signals from the gas flow control, the calibration apparatus comprising:

a mass flow meter;

a meter input valve and having
an output connected to an input of the mass flow meter, and
an input connected to the input of the final valve;

a meter input solenoid having
an input in electrical communication with the gas flow control providing a signal to operate the meter input solenoid, and
an output in communication with a control input of the meter input valve for operating the meter input valve; and a switch device and coupled between an output of the final valve solenoid and the control input of the final valve, the switch device having a control input coupled to the output of the meter input solenoid, whereby operation of the meter input solenoid by the gas flow control to open the meter input valve closes the switch device and prevents the final valve solenoid from operating the final valve, thereby inhibiting a flow of gas to the chamber and enabling a flow of gas from a selected mass flow controller, through the meter input valve and the mass flow meter to check calibration of the selected mass flow controller and whereby further, the operation of the meter input solenoid by the gas flow control to close the meter input valve causes the calibration switch to open to permit the final valve solenoid to operate the final valve, thereby inhibiting a flow of gas through the meter input valve and permitting a flow of gas to be directed through the final valve and into the chamber.

2. The calibration apparatus of claim 1 further comprising a gas control panel on which the final valve, the final valve solenoid and the mass flow controllers are mounted.

3. The calibration apparatus of claim 2 wherein the mass flow meter, the meter input valve, the meter output solenoid and the switch device are mounted on the gas control panel.

4. The calibration apparatus of claim 1 wherein the switch device is a normally-open device for controlling fluid flow.

5. The calibration apparatus of claim 1 wherein the output of the meter input solenoid is fluidly connected to the control inputs of the meter input valve and the switch device.

6. A calibration apparatus for a gas control system controlling the flow of different gases between remote gas sources and a processing chamber, a gas control panel including a final valve having an input in fluid communication with a plurality of mass flow controllers and an output connected to the processing chamber, the final valve being connected to a final valve solenoid having an input in electrical communication with a gas flow control and an output in communication with a control input of the final valve, the final valve solenoid causing the final valve to open and close in response to signals from the gas flow control, the calibration apparatus comprising:

a mass flow meter;

a first meter valve having
an output connected to an input of the mass flow meter, and
an input connected to an input of the final valve;

a first meter solenoid having
an input in electrical communication with the gas flow control providing a signal to operate the first meter solenoid, and
an output in communication with a control input of the first meter valve for operating the first meter valve;

a second meter valve having an input connected to an output of the mass flow meter;

a second meter solenoid having
an input in electrical communication with the gas flow control providing a signal to operate the second meter solenoid, and
an output in communication with a control input of the second meter valve for operating the second meter valve; and a switch device coupled between an output of the final valve solenoid and the control input of the final valve, the switch device having a control input coupled to one of the outputs of the meter solenoids, whereby operation of the one of the meter solenoids by the gas flow control to open a respective meter valve closes the switch device to prevent the final valve solenoid from operating the final valve, thereby inhibiting a flow of gas to the chamber and enabling a flow of gas from a selected mass flow controller, through the first meter valve and the mass flow meter to check calibration of the selected mass flow controller and whereby further, the operation of the one of the meter solenoids by the gas flow control to close the respective meter valve causes the switch device to open and permit the final valve solenoid to operate the final valve, thereby inhibiting a flow of gas through the first meter valve and permitting a flow of gas to be directed through the final valve and into the chamber.

7. The calibration apparatus of claim 6 further comprising a gas control panel on which the final valve, the final valve solenoid and the mass flow controllers are mounted.

8. The calibration apparatus of claim 7 wherein the mass flow meter, the first meter valve, the first meter solenoid, the second meter valve, the second meter, solenoid and the switch device are mounted on the gas control panel.

9. The calibration apparatus of claim 6 wherein in the switch device is a normally-open device for controlling fluid flow.

10. The calibration apparatus of claim 6 wherein the control input of the switch device is connected to the output of the first meter solenoid.

11. The calibration apparatus of claim 6 wherein the outputs of the meter solenoids are fluidly connected to the control inputs of the respective meter valves and output of the one of the meter solenoids is fluidly connected to the control input of the switch device.

12. A calibration apparatus for a gas control panel controlling the flow of different gases between remote gas sources and a processing chamber, the gas control panel including a plurality of mass flow controllers, each mass flow controller having a control input in electrical communication with a gas flow control, a plurality of input valves connected between respective inputs of the mass flow controllers and the remote gas sources, a plurality of input valve solenoids connected to respective ones of the plurality of input valves to open and close the respective ones of the plurality of input valves, each of the input valve solenoids having an input in electrical communication with the gas flow control and an output in fluid communication with a control input of a respective input valve, a plurality of output valves having inputs connected to outputs of the mass flow controllers, a plurality of output valve solenoids connected to respective ones of the plurality of output valves to open and close the respective ones of the plurality of output valves, each of the output valve solenoids having an input in electrical communication with the gas flow control and an output in fluid communication with a control input of a respective output valve, a final valve having an input in fluid communication with outputs of the plurality of output valves and an output connected to the processing chamber, a final valve solenoid connected to the final valve to open and close the final valve, the final valve solenoid having an input in electrical communication with the gas flow control and an output in fluid communication with a control input of the final valve, the calibration apparatus comprising:

a mass flow meter mounted on the gas control panel;

a meter input valve mounted on the gas control panel and having
- an output connected to an input of the mass flow meter, and
- an input connected to the outputs of the output valves;

a meter input solenoid mounted on the gas control panel and having
- an input in electrical communication with the gas flow control providing a signal to operate the meter input solenoid, and
- an output in fluid communication with a control input of the meter input valve for providing different fluid pressures to operate the meter input valve;

a meter output valve mounted on the gas control panel and having an input connected to an output of the mass flow meter;

a meter output solenoid mounted on the gas control panel and having
- an input in electrical communication with the gas flow control providing a signal to operate the meter input solenoid, and
- an output in fluid communication with a control input of the meter output valve for operating the meter output valve; and a calibration switch mounted on the gas control panel and coupled between the output of the final valve solenoid and the control input of the final valve, the calibration switch having a control input coupled to the output of one of the meter input and meter output solenoids, whereby operation of the one of the meter input and meter output solenoids by the gas flow control to open a respective one of the meter input and meter output valves closes the switch device to prevent the final valve solenoid from operating the final valve, thereby inhibiting a flow of gas to the chamber and enabling a flow of gas from a selected mass flow controller, through the meter input valve and the mass flow meter to check calibration of the selected mass flow controller and whereby further, the operation of the meter input solenoid by the gas flow control to close the respective one of the meter input and meter output valves causes the calibration switch to open to permit the final valve solenoid to operate the final valve, thereby inhibiting a flow of gas through the mass flow meter and permitting a flow of gas to be directed through the final valve and into the chamber.

13. The calibration apparatus of claim 12 wherein the control input of the calibration switch is coupled to the output of the meter input solenoid.

14. The calibration apparatus of claim 12 wherein the meter input valve and the meter input solenoid comprises respectively one of the plurality of input valves and one of the plurality of input valve solenoids.

15. The calibration apparatus of claim 14 wherein the meter output valve and the meter output solenoid comprises respectively one of the plurality of output valves and one of the plurality of output valve solenoids.

* * * * *